United States Patent [19]

Amtmann

[11] Patent Number: 4,514,759
[45] Date of Patent: Apr. 30, 1985

[54] DIAGNOSTIC RADIOLOGY SYSTEM FOR ANGIOGRAPHIC X-RAY EXAMINATIONS

[75] Inventor: Heribert Amtmann, Langensendelbach, Fed. Rep. of Germany

[73] Assignee: Siemens Aktiengesellschaft, Berlin & Munich, Fed. Rep. of Germany

[21] Appl. No.: 425,279

[22] Filed: Sep. 28, 1982

[30] Foreign Application Priority Data

Jan. 26, 1982 [DE] Fed. Rep. of Germany ....... 3202449

[51] Int. Cl.³ .......................... H04N 5/32; A61B 6/00
[52] U.S. Cl. .................................... 358/111; 128/654
[58] Field of Search ................. 358/111; 128/653, 654

[56] References Cited

U.S. PATENT DOCUMENTS

| | | | |
|---|---|---|---|
| 4,204,226 | 5/1980 | Mistretta et al. | 358/111 |
| 4,444,196 | 4/1984 | Stein | 358/111 |
| 4,450,478 | 5/1984 | Ledley | 358/111 |

Primary Examiner—John C. Martin
Assistant Examiner—Victor R. Kostak
Attorney, Agent, or Firm—Hill, Van Santen, Steadman & Simpson

[57] ABSTRACT

An exemplary embodiment comprises an image intensifier television chain and an image subtraction device, connected thereto, with three image memories. In two image memories, a blank image is stored, respectively, whereby the first blank image is automatically stored long before commencement of the rise of the contrast medium concentration. Through observation of the difference image in a fluoroscopy operation with a low dose rate, the time of the rise of the contrast medium concentration can be precisely located. Then a radiographic recording series follows with a high dose rate per image. This radiographic series may be retained in an on-line operation using a hard copy-series device. No subsequent off-line-operation is necessary.

2 Claims, 3 Drawing Figures

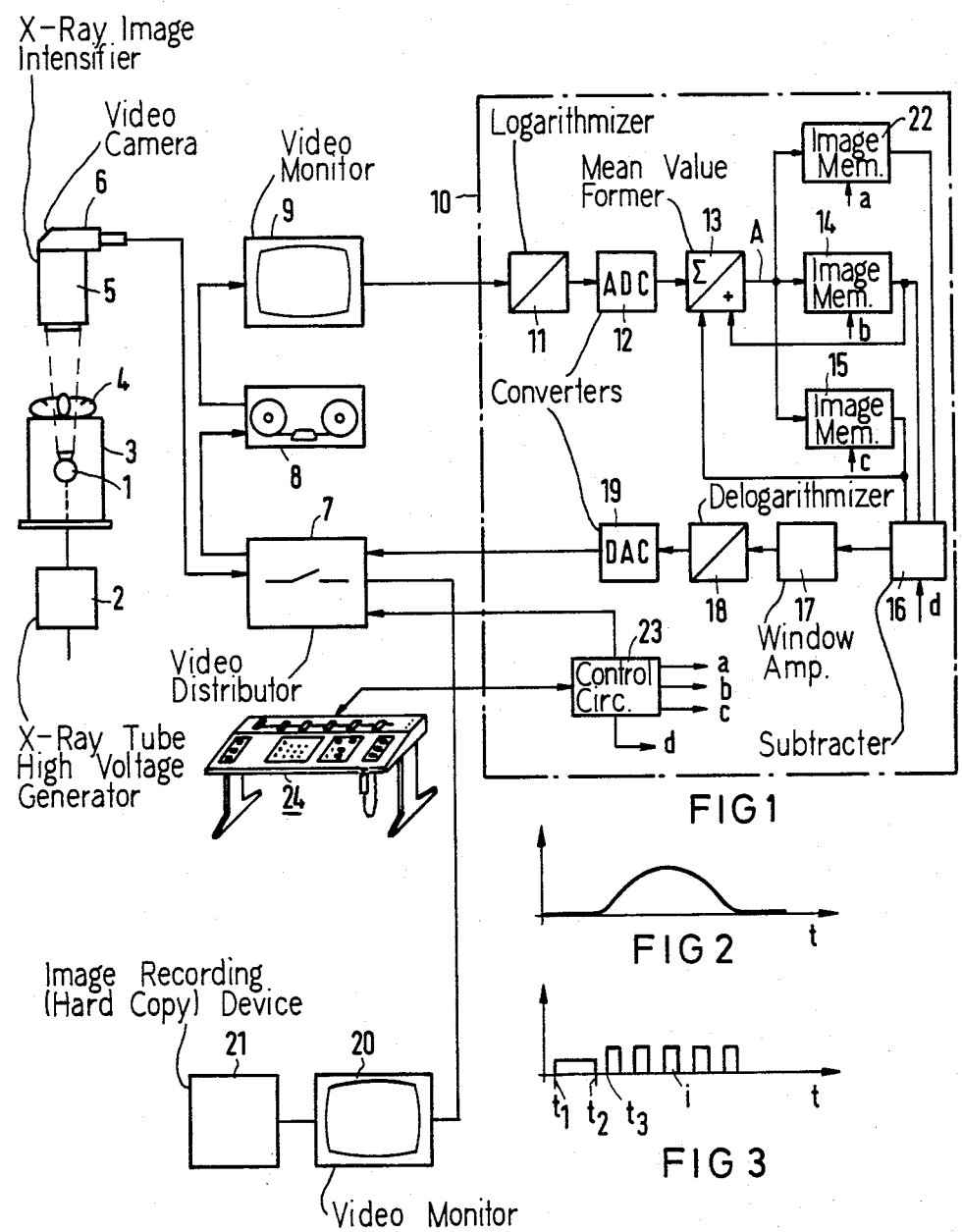

DIAGNOSTIC RADIOLOGY SYSTEM FOR ANGIOGRAPHIC X-RAY EXAMINATIONS

BACKGROUND OF THE INVENTION

The invention relates to a diagnostic radiology system for angiographic x-ray examinations, comprising an image intensifier television chain and an image subtraction device connected thereto with two image memories in which, controlled by a control device, image data occurring at different times can be stored and with which a subtracter for the subtraction of the memory contents is connected, as well as comprising a display device for displaying the subtraction images. The display device contains a hard copy installation for documentation purposes. This hard copy installation permits the recording of a series of subtraction images in an on-line operation.

A diagnostic radiology system of this type is described in the German patent application P 31 22 098.3. In the case of this diagnostic radiology system, it is possible, in the first image memory, to store an x-ray image or several integrated x-ray images which correspond to a blank image of the radiography subject, and to store in the second image memory an x-ray image, or several integrated x-ray images which correspond to the same region of the radiography subject, where, however, an x-ray contrast medium has been introduced in the blood vessels. The subtracter forms the difference between the stored images, so that the thus-formed difference image shows only the blood vessels important for the diagnosis which are filled with contrast medium.

For the examination it is important to conduct the storage of the blank image, if possible, at the moment of the just-increasing contrast medium concentration of the subject to be examined. However, this time is difficult to locate, for one can observe the course (or progression) of the contrast medium concentration, in the case of the known diagnostic radiology systems, only when the blank image is already stored, because only then is a subtraction image displayed.

SUMMARY OF THE INVENTION

The object underlying the invention resides in designing a diagnostic radiology system of the cited type such that the time for the storage of the blank image can be optimally established corresponding to the wishes of the examining physician.

In accordance with the invention this object is achieved in that a third image memory is present and that, through the control device, selectively a mask for the image subtraction is capable of being placed in one of two image memories and the image to be subtracted therefrom, respectively, is capable of being stored in the additional image memory. In the inventive diagnostic radiology system, first a blank image can be stored in an image memory long before the rise of the contrast medium concentration, and the subtraction image formed due to said blank image can be observed with a low fluoroscopy dose. In the thus-formed subtraction image, now the commencing rise of the contrast medium concentration can be recognized and, at this time, in an additional image memory, the then-present optimum blank image can be stored. Subsequently, the image subtraction, on the basis of the last-stored optimum blank image and a filling image, can proceed with a higher dose per image.

The invention shall be explained in greater detail in the following on the basis of an exemplary embodiment illustrated on the accompanying drawing sheet; and other objects, features and advantages will be apparent from this detailed disclosure and from the appended claims.

BRIEF DESCRIPTION OF THE DRAWING

FIG. 1 illustrates a diagnostic radiology system according to the invention, and FIGS. 2 and 3 illustrate curves for the purpose of explaining FIG. 1.

DETAILED DESCRIPTION

In FIG. 1, an x-ray tube 1 is illustrated which is fed by an x-ray high voltage generator 2 and which irradiates a patient 4 lying on an x-ray table 3. An image intensifier television chain, equipped with an x-ray image intensifier 5 and a television camera 6, picks up the x-ray images and converts them into a video signal which is supplied to a video distributor 7. The video distributor 7 controls the recording of the x-ray images on a video recorder 8 and the display of these images on a monitor 9.

For the purpose of generating difference images, the video signal is supplied to an image subtraction device 10. The video signal is supplied either in real time, or by the video recorder 8 to the image subtraction device 10 at whose input a logarithmizer 11 is connected whose output signal is supplied to an analog-to-digital converter 12. The logarithmizer 11 causes signals to be subtracted from one another which are proportional to the sum of the products of mass attenuation coefficient and masses of all substances which lie in the ray path. Connected with the analog-to-digital converter 12 is a mean value formation unit 13 which conducts a sliding, weighted mean value formation for the purpose of improvement of the signal-to-noise ratio. Also, a summation of image signals can proceed. The thus-obtained image signals are stored in two image memories 14 and 15 which are connected to a subtracter 16 whose output signal, via a window amplifier 17, a delogarithmizer 18, and a digital-to-analog converter 19, is supplied to the video distributor 7 which effects the display of the subtraction images on a monitor 20. With the aid of an image recording device 21, the subtraction images can be permanently retained, for example photographed.

For the production of angiographic subtraction images, following injection of a contrast medium in a blood vessel, shortly prior to the rise of the contrast medium concentration in the examined vessel region, a mask is placed in the image memory 14, which mask corresponds to several blank images. The averaged or integrated, respectively, blank images are stored in the image memory 14. Subsequently, given a specific contrast medium filling of the vessel region to be examined, an average-formation, or integration, respectively, of several television images, is effected, and these filling images are stored in the image memory 15. If the contents of the memories 14 and 15 are subtracted from one another by the subtracter 16, then subtraction images can be displayed on the monitor 20 which show only the vessels filled with contrast medium, but which no longer contain the background which is always the same.

The illustrated diagnostic radiology system contains, in addition to the image memories 14 and 15, yet a further image memory 22. The latter is controlled, as are the image memories 14 and 15 as well as the subtracter 16, by the control device 23. Via the operating console 24, long before commencement of the rise of the contrast medium concentration in the examined vessel region, a mask can be placed in the image memory 22; i.e., a blank image or a number of blank images can be stored. This blank image serves only the purpose of locating the later optimum blank image; thus, the desired blank image video information can be automatically stored in memory 22 upon commencement of the examination procedure. The examination time until the location of the optimum mask can be effected with a substantially lower dose rate than the still-following radiography recording operation. With storage of the optimum mask, the dose rate per image is increased or switched over to series-operation with a higher dose rate. If there is supplied to the image substraction device this stored blank image from memory 22 and the respectively current video signal, i.e. the respectively current image, then, on the monitor 20, the rise of the contrast medium concentration in the examined vessel region can be recognized and, immediately upon commencement of this rise, the blank image important for the examination can be stored in the image memory 14. If later, controlled by the control device 23 in the operating console 24, the optimum blank image in the image memory 14 is then subtracted from the filling image in the image memory 15, one obtains an optimum subtraction image. These subtraction images then have been provided with an increased dose rate.

FIG. 2 shows an example of the progression of the contrast medium concentration in an examined blood vessel. FIG. 3 shows, in the same time scale, the progression of the dose rate of the x-ray tube. From FIG. 3 it is apparent that, at a time t1, i.e. long before commencement of the rise of the contrast medium concentration, with a relatively low dose rate, a blank image is stored in the image memory 22 which is subtracted from the respectively current image until the time t2 so that, up to this time, a subtraction image can be displayed on the monitor 20. At the time t2, the user recognizes that now the blank image desired for the actual image subtraction must be stored in the memory 14 and, to this end, activates a corresponding key on the operating console 24. Through activation of this key a switching-over is effected to pulsed x-radiation which commences at time t3. With the first pulse the blank image is stored in the memory 14, whereas the filling image is stored in the neighborhood of the maximum of the contrast medium concentration; for example, at the pulse i, several filling images can also be formed in series operation; the documentation of the resulting difference images proceeds with the image recording device 21 (hard copy device).

In addition, from the time of the storage of the optimum mask in memory 14, a representation with continuous difference formation between two images of a series is possible, whereby the difference images can likewise be retained with the hard copy device.

It will be apparent that many modifications and variations may be made without departing from the scope of the teachings and concepts of the present invention.

I claim as my invention:

1. A diagnostic radiology system for angiographic x-ray examinations, comprising an image intensifier television chain, first and second image memories, control means controlling said memories for effecting storage of image data arriving at different times, subtractor means connected with said image memories for effecting the subtraction of the memory contents, and a reproduction device for registering the subtraction images, a third image memory being present, said control means controlling said first and third image memories to selectively effect storage of a masking image in said first and in said third of said image memories, and controlling said second image memory to effect storage of an image in said second image memory for processing in said subtractor means selectively in conjunction the masking image stored by said third image memory, and selectively in conjunction with the masking image stored by said first image memory.

2. Method for the operation of an x-ray diagnostics installation according to claim 1, characterized in that a first blank image is first deposited in one of the image memories and the subtraction image is reproduced from the first blank image and the respectively current image; in that a second blank image is deposited in a further image memory upon recognition of the rise of the contrast agent concentration; and in that, finally, the fill image is deposited in the third image memory at the maximum of the contrast agent concentration, whereby the dose rate is increased upon deposit of the second blank image.

* * * * *